UNITED STATES PATENT OFFICE.

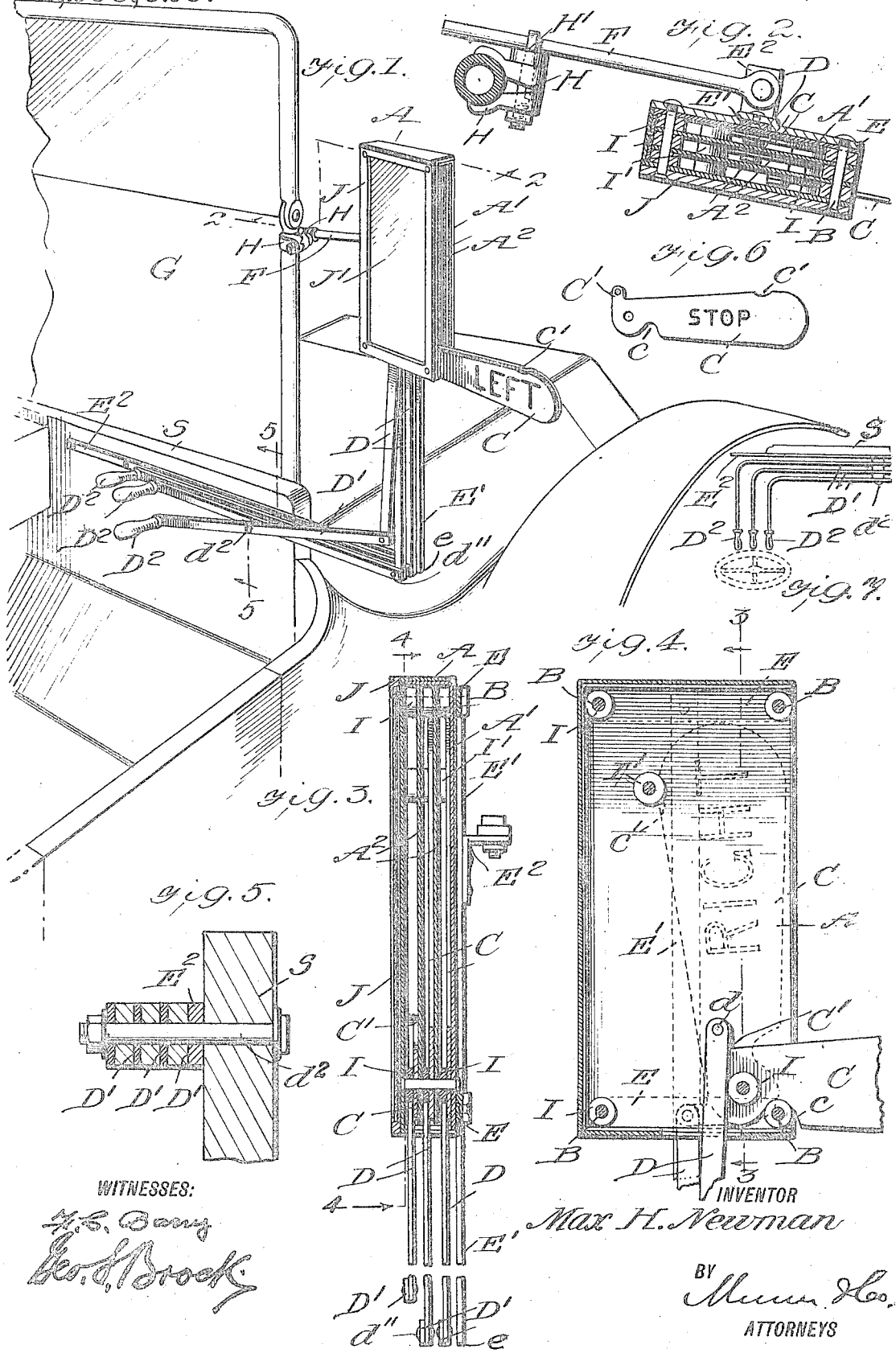

MAX H. NEWMAN, OF ATLANTIC CITY, NEW JERSEY.

AUTOMOBILE-SIGNAL.

1,208,625.

Specification of Letters Patent.

Patented Dec. 12, 1916.

Application filed December 16, 1915. Serial No. 67,267.

*To all whom it may concern:*

Be it known that I, MAX H. NEWMAN, a citizen of the United States, and a resident of Atlantic City, in the county of Atlantic and State of New Jersey, have invented certain new and useful Improvements in Automobile-Signals, of which the following is a specification.

My invention relates to improvements in signal attachments for automobiles and similar vehicles and more particularly to visual signals designed to be attached to the windshield thereof, the main object of the device being to acquaint and notify others in the rear of the automobile carrying the signal of the intention of the operator thereof.

Another object is to provide a combined signaling device and mirror attachment whereby the operator of the vehicle can ascertain the exact conditions to his rear.

Another object is to produce an improved signal and mirror attachment which can be cheaply made and readily applied to or detached from an ordinary windshield.

With these and other objects in view my invention consists in certain novel features of construction, arrangement and combination of parts as will be hereinafter described and pointed out in the claims reference being had to the accompanying drawing in which—

Figure 1 is a perspective view of my improvements as applied to the automobile. Fig. 2 is a horizontal section on line 2—2 of Fig. 1. Fig. 3 is a vertical section taken on line 3—3 of Fig. 4 looking in direction of the arrows. Fig. 4 is a vertical section on line 4—4 of Fig. 3. Fig. 5 is a section on line 5—5 of Fig. 1. Fig. 6 is a view of one of the semaphores detached. Fig. 7 is a view showing modified handles for the levers.

In carrying out my invention I provide a casing in the form of a rectangular box open at one side such box being preferably made of sheet metal and in two sections A and A' held together by bolts or rivets B at the corners and other suitable places; held within the casing by said bolts or rivets are two thin sheet metal partitions $A^2$ which divide the casing into three compartments or chambers within which are housed the semaphore blades C which may be swung into and out of the casing by means of levers and connecting rods which will later be described. Each semaphore blade which is of configuration shown in Fig. 6 is provided at its lower end with a projection or crank arm C' to which is pivotally attached by bolts or rivets a vertical rod D, pivotally connected at its lower end to a horizontal bar D'. The casing is supported in place at one side of the windshield by a frame consisting of the upper and lower cross bars E and the vertical connecting bar E' said frame being held to the back of the casing by the fastening means at the corners or other suitable means; the vertical member E' of the frame has a bracket lug $E^2$ extending rearwardly therefrom to which is pivotally secured a rod F which engages a clamp secured to the edge of the windshield or the dashboard of the automobile; this clamp as shown comprises gripping members H clamped to the windshield by an eyebolt H'; the rod F is held to the clamp by this eyebolt, so that it can be removed or adjusted as occasion requires.

The three semaphore blades are pivotally mounted at one corner of the casing and each of them works within a chamber or compartment separately and independently of each other, these chambers being formed by the partitions $A^2$. In assembling the casing with the blades in place, the blades are laid in place against a partition, then washers I of rubber or other suitable material placed on the bolts and on the face of that semaphore; then the next partition is put in place therein; then the next semaphore blade and the same arrangement of washers; and finally the front face A is put on and the mirror frame J secured thereto, it being preferred that all of these parts be held in place by the bolts or rivets holding the front and rear members of the casing together.

It will be noted that the semaphore blades each have their front edge provided with a curved notch $c$ and that also the rear edge is provided with a curved notch $c'$, the purpose of these notches being to receive the edge of the washers I and I' and form cushioning devices at these points; the washer I' also acts as a stop to prevent the semaphore blade being swung too far into its compartment.

The mirror frame J which carries a mirror J' is held to the one face of the casing and is disposed at angles at one side of the windshield so that the operator may get a clear view of conditions at the rear of his car, and the angularity may be regulated through the clamp H, rod F and bracket E².

As before stated the horizontal arms are pivotally secured to the inside of the dash and they are further provided with suitable handles D² at their inner ends by which they may be manipulated, these handles may be offset squarely at the end or the bars D' may be bent inwardly to come into proximity with the steering wheel suitable hand grips being provided; suitable washers are placed between the bars D' so that they are properly spaced to permit movement with as little friction as possible.

Each of the semaphore blades bears an appropriate word or legend, and in the present instance one will bear the word "Right", another "Stop" and the third one the word "Left", the words being intended to convey visually to the driver of the cars behind that the signal operator intends to turn to the right, to stop, or turn to the left as the particular semaphore indicates.

While this device is shown applied to the right side of a car it may be placed on the opposite side by simply removing the pivot pin $d^2$ dropping the rods D' and swinging them on pivots $d''$ to project in the opposite direction; then removing the frame at the back of the casing, then the mirror carrying frame and placing it on the former rear face of the casing removing the clamp and transferring it to the opposite side of the windshield, clamping it to place thereon and securing the rods to that side of the car and to the inside of the dash, it being noted that the vertical bar E' at the rear of the casing extends downwardly and is bent at its lower end and continues inwardly as a bracing and attaching bar E² which is secured to the inside of the dash S.

By combining the mirror or reflecting surface with the semaphore signaling means the driver of the auto is enabled to determine whether he is far enough in advance of the other vehicles to obviate the necessity for giving a signal.

I claim:

1. A visual signal adapted to be attached to the windshield of automobiles and other vehicles and comprising a casing open at one side and provided with a plurality of vertical compartments therein, said casing secured to a frame adapted to be rigidly secured at its lower end to the dash of the automobile and pivotally connected at its upper end to one end of a horizontal rod a clamp member adapted to be vertically and horizontally adjusted on the side edge of the windshield and slidably supporting the opposite end of said horizontal rod, semaphore blades pivotally mounted at their lower ends within the aforesaid compartments, vertical rods connected at their upper ends to the lower ends of said blades, horizontal levers adapted to be pivotally mounted on the dash of the vehicle and pivotally connected to the lower ends of said rods, handles projecting from said levers, and cushion stops within the aforesaid compartments to engage the edges of the blades when swung back into the compartments.

2. A visual signal adapted to be attached to the windshield of an automobile and comprising a casing open at one side and provided with a plurality of vertical compartments therein, said casing adapted to be rigidly connected at its lower end to the dash of the automobile, and pivotally connected to one end of a horizontal rod, a clamp adapted to be detachably and adjustably screwed to the side edge of the windshield and slidably holding the opposite end of said horizontal rod, semaphore blades pivotally mounted within said compartment, and means adapted to be detachably secured to the dash of the automobile for operating said blades.

3. A visual signal adapted to be removably applied to the windshield of automobiles and other vehicles and comprising a casing open at one side and provided with three vertical compartments therein, said casing secured to a frame, said frame adapted to be rigidly secured at its lower end to the dash of the automobile and pivotally connected at its upper portion to a rod, said rod slidably mounted in a clamp, said clamp adapted to be detachably secured to the windshield frame, notched semaphore blades pivotally mounted within the aforesaid compartments, vertical rods pivotally connected at their upper ends to the lower ends of the semaphore blades, horizontal levers adapted to be pivotally mounted on the dash of the vehicle, and handles projecting inwardly from the said levers, cushion washers separating the partitions and adapted to be engaged by the notched semaphore blades.

MAX H. NEWMAN.